United States Patent [19]

Schosek

[11] 4,274,758
[45] Jun. 23, 1981

[54] DEVICE TO SECURE AN UNDERGROUND PIPE INSTALLER IN A TRENCH

[76] Inventor: William O. Schosek, 7942 Marx Dr., North Fort Myers, Fla. 33903

[21] Appl. No.: 149,172

[22] Filed: May 12, 1980

Related U.S. Application Data

[63] Continuation-in-part of Ser. No. 68,151, Aug. 20, 1979.

[51] Int. Cl.³ .............................................. F16L 1/02
[52] U.S. Cl. ...................................... 405/184; 175/62; 254/29 R; 405/154
[58] Field of Search ....................... 405/184, 154, 132; 254/29 R; 175/62, 19; 299/33; 193/153, 164

[56] References Cited

U.S. PATENT DOCUMENTS

| | | | |
|---|---|---|---|
| 2,167,500 | 7/1939 | Dornfeld et al. | 175/19 |
| 2,196,260 | 4/1940 | Gatto | 175/62 X |
| 2,482,367 | 9/1949 | Ravers | 405/282 |
| 2,879,101 | 3/1959 | Daroci | 254/29 R X |
| 3,263,430 | 8/1966 | Bryan | 405/282 |
| 3,477,762 | 11/1969 | Frenyo et al. | 175/62 X |
| 4,106,634 | 8/1978 | Becker | 254/2 R X |

Primary Examiner—Dennis L. Taylor
Attorney, Agent, or Firm—Alfred E. Wilson

[57] ABSTRACT

A pair of elongated abutment members are provided in a parallel arrangement outwardly of respective sides of an underground pipe installer device, and a link arrangement connects the abutment members to the respective sides in a manner whereby the spacing between the members may be forcibly expanded by utilizing the drive forces of the pipe installer by interconnecting an underground hole forming rod, conventionally engaged in the installer to the link arrangement during a forward drive operation thereof. A pair of screw shafts connect between the installer device and the linkage in a manner whereby lock nuts, when engaged on the screw shafts, serve to lock the abutment members in their expanded positions. Removal of the lock nuts relieves the expansion forces and permits the abutment members to be moved oppositely inwardly toward the installer device.

9 Claims, 3 Drawing Figures

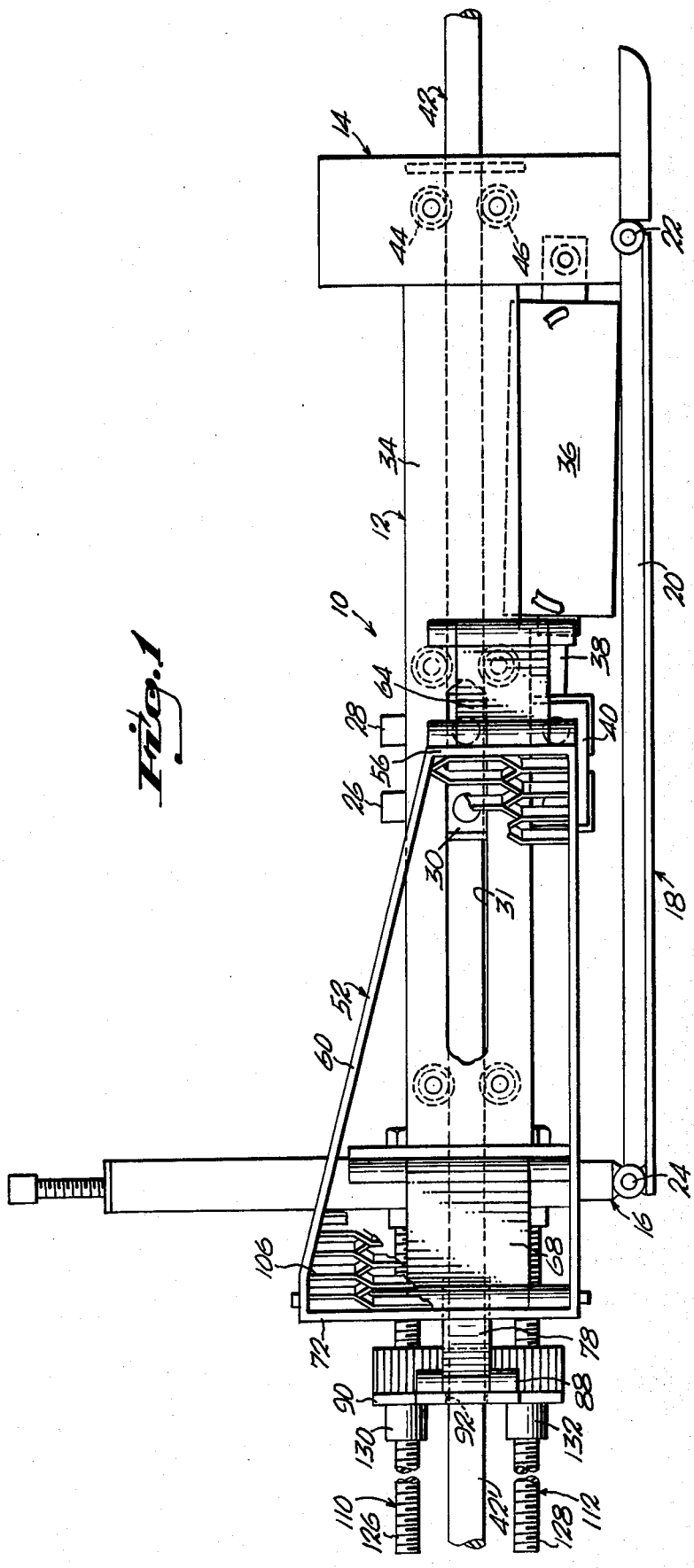

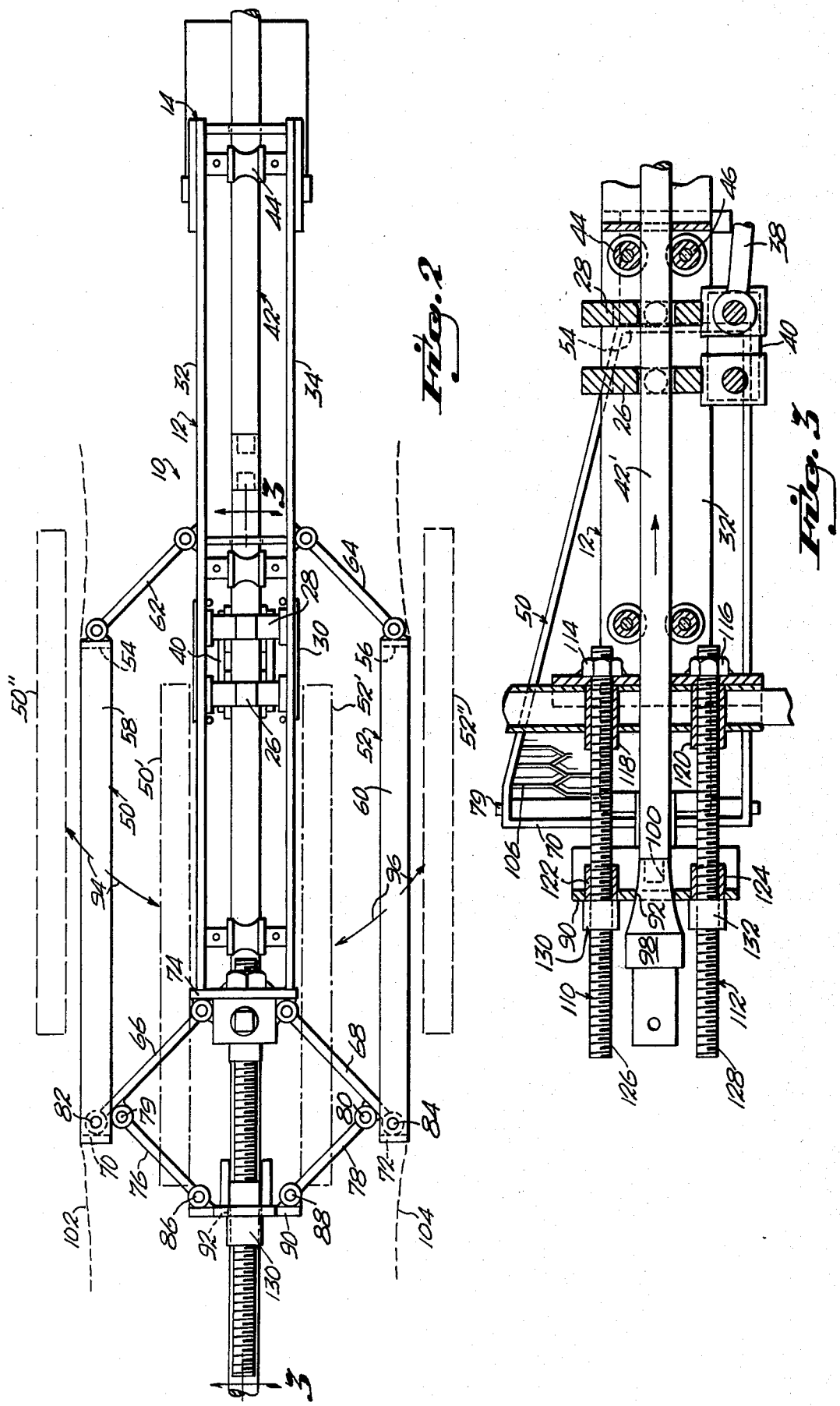

DEVICE TO SECURE AN UNDERGROUND PIPE INSTALLER IN A TRENCH

BACKGROUND OF THE PRESENT INVENTION

The present invention pertains to an underground pipe installer device, and more particularly to a structural arrangement to secure the underground pipe installer within an operating trench prior to the pipe installing operation.

It is routine procedure in underground pipe installing operations to provide an operating trench on one side of a street or driveway, for example, under which a pipe is to be installed, and a target trench on the opposite side thereof. An underground pipe installer device is positioned and secured in the operating trench. A first push rod length is manually inserted in drive jaws of the device and operably engaged thereby to push the first rod length into the ground toward the target trench, generally by a fluid operated cylinder and piston assembly. The trailing end of the first rod length is provided with a coupling to receive a leading end of a second rod length, and the drive means is actuated to drive the second rod length forwardly toward the target trench. A subsequent plurality of rod lengths are successively interconnected in a like manner and driven forwardly until a leading tip end of the first rod length emerges into the target trench.

The leading tip end is threadedly provided with a pusher cap which is removed and replaced with a hole spreaded attachment which is attached to an end of a pipe to be permanently installed under the above surface in the hole thusby formed. For this purpose, means are provided to reverse the direction of movement of the rod assembly to pull the pipe attached thereto backwardly through the hole, formed by the rod assembly, until the leading end of the pipe emerges into the operating trench.

The above described operations are quite conventional, however, it is essential to anchor the pipe installer device securely in the operating trench against the very substantial reaction forces of the rod pushing operation so as to maintain a sufficient space behind the installer device to accomplish the manual rod coupling and uncoupling operations during the hole forming operation and in withdrawing the pipe into the hole.

It has been a general practice to brace the installer device against the rear end wall of the operating trench during the rod pushing operation, the bracing structure was then removed and reinstalled to engage against the front trench wall for the pipe pulling operation. Examples of brace means of this type are disclosed in Applicant's U.S. Pat. Nos. 3,907,253, 3,988,003 and 3,988,004.

Therefore, one of the principal objects of the present invention is to provide a pair of elongated abutment members in a parallel arrangement outwardly of respective sides of an underground pipe installer device, and connection means from the pair of abutment members to the main power source to utilize the very substantial power forces thereof to firmly engage the abutment members against respective side walls of the operating trench in a manner whereby the rod pushing and pipe pulling operations are accomplished without dislocating the pipe installer device.

A further object of the invention is to provide link means connecting between the abutment members and the push rod in a manner so as to utilize the forces of the main power source as said forces are being applied to the push rod in a forward direction.

Another object of the invention is to provide means to releasably lock the link means with the abutment members securely engaged against the side walls.

BRIEF DESCRIPTION OF THE DRAWINGS

FIG. 1 is a side elevational view of an underground pipe installer incorporating the parallel abutment members of the present invention;

FIG. 2 is a top plan view of FIG. 1; and

FIG. 3 is a longitudinal vertical sectional view taken along line 3—3 of FIG. 2.

DESCRIPTION OF A PREFERRED EMBODIMENT

With reference to the drawings, and particularly to FIGS. 1 and 2, an underground pipe installer device, designated generally at 10, includes a main central length 12 connecting between front and rear end portions 14, 16, mounted to a base 18 including a main central length 20, connected at 22, 24 between front and rear end portions 14, 16.

A pair of reversible drive jaws 26, 28 are slidably journaled as at 30 in slots 31, in respective side walls 32, 34 of the central length 20, FIG. 2. A fluid operated cylinder and piston assembly 36, 38 are operably connected by links 40 to jaws 26, 28 to provide a reciprocating drive movement to a push rod assembly 42, comprised of a coupled plurality of rod lengths, engaged in jaws 26, 28 in a manner whereby the rod assembly 42, first, may be driven forwardly through the ground to form a hole between operating and target trenches, and, second, the jaws are then reversed to pull a pipe, attached to a leading tip end of the rod assembly 42, through the length of the hole into an installed position (not shown). The push rod 42 is guided and controlled along the length of the device 10 by a plurality of pairs of guide rollers such as 44, 46. The above described operations are generally conventional, and the mechanisms to perform said operations form no part of the present invention.

However, it is essential to the above operations to securely anchor the installer device 10 in the operating trench. To this end, a pair of elongated abutment members 50, 52, FIG. 2. At a forward end, members 50, 52 are pivotally linked between respective front vertical walls 54, 56 of abutment member frames 58, 60, and respective central length side walls 32, 34 by links 62, 64. Similar rear end links 66, 68 pivotally connected between respective rear vertical walls 70, 72 of frames 58, 60 and a front end main frame plate 74 to co-act with links 62, 64. A second pair of rear end links 76, 78 pivotally connect at respective outer ends 79, 80 to links 66, 68 adjacent outer pivotal connections 82, 84, thereof to abutment members 50, 52, and at inner ends 86, 88 to a lock plate 90 which is provided with a central through hole 92 normally providing a through free passageway for push rod assembly 42, FIGS. 1 and 2.

It is to be noted that the two pairs of links 66, 68 and 76, 78 generally define a parallelogram. When plate 90 is moved longitudinally inwardly or outwardly the abutment members 50, 52 are adjusted in general lateral directions, indicated by arrows 94, 96 between an inner extreme 50', 52' and an outer extreme 50", 52" illustrated in broken lines.

With reference to FIG. 3, in use, a push rod such as 42' is engaged in the jaws 26, 28. Means, such as a hole expander tool 98 is threaded onto an existing threaded stud 100 on the trailing end of rod 42' and the jaws 26, 28 are power actuated by cylinder and piston assembly 36, 38 as hereinbefore described to advance rod 42' as in the hole forming operation. Tool 98 wedges into hole 92 in plate 90 and pulls said plate 90 forwardly under the influence of the tremendous forces of cylinder and piston assembly 36, 38, engaging abutment members 50, 52 with vertical side walls of the operating trench, indicated schematically at 102, 104, FIG. 2, under the influence of the same degree of forces.

The areas within the confines of abutment member frames 58, 60 are enclosed, preferably by a heavy expanded sheet metal, fragmentarily illustrated at 106.

Means other than the hole expander tool 98 may be utilized to draw the abutment members into engagement with the side walls 102, 104, however, this tool is readily at hand as it is conventionally used to draw pipes backwardly through a hole formed by the rod assembly 42 while, at the same time, providing a tapered leading end to expand the hole to the diameter of the pipe. A pair of screw rods 110, 112, disposed in a parallel relation to the rod 42' and preferably centered in a common vertical plane therewith, having forward ends fixed relative to front plate 74 as by a threaded engagement in nuts 114, 116 fixed as by welding to plate 74. Screw rods 110, 112 extend rearwardly and freely through sleeves 118, 120, fixed through a leveling jack housing and forming no part of the present invention, and sleeves 122, 124 fixed to and extending through plate 90 to rearward extended ends 126, 128. Nut means, such as interiorly screwthreaded sleeves 130, 132 are threaded onto the extended ends 126, 128 into engagement with a rear face of plate 90, after the abutment members 50, 52 are power set in place. In this manner, the pipe installer is securely anchored in place in the operating trench. To release same, the threaded sleeves 130, 132 are run rearwardly on extended ends 126, 128. In some applications, particularly where the soil is sandy, a relatively heavy sheet of plywood may be interposed between the abutment members 50, 52 and the trench walls 102, 104.

I claim:

1. A device to secure an underground pipe installer relative to opposed generally vertical side walls of an operating trench, the pipe installer device being of a type which includes reversible power operated means to drive a rod assembly, formed of a plurality of coupled rod lengths, forwardly through the ground from the operating trench for penetration into a target trench, in a forward drive mode, and to withdraw the rod assembly, in a reverse drive mode, with a pipe or other conduit means attached to a leading end thereof, into an installed position within the hole formed in the ground by the rod assembly, the device to secure comprising a pair of elongated abutment members in a generally parallel arrangement outwardly of respective side walls of a main length of the underground pipe installer, pivotal link means connecting said abutment members to respective side walls of the main length in a manner whereby said pair of elongated abutment members may be synchronously pivoted to oppositely outwardly expanded, generally parallel positions, from inwardly retracted positions, adjacent to the main length; and means to connect a trailing end of a hole forming rod length, operably engaged in the installer, to said link means in a manner so as to forcably drive said abutment members from said retracted positions to said expanded positions when the power operated means is operated in the forward drive mode; and lock means to secure said abutment members in said expanded positions.

2. The device to secure as defined in claim 1 wherein each of said elongated abutment members is of a predetermined size and configuration, defined by a peripheral frame.

3. The device to secure as defined in claim 2 wherein each peripheral frame is enclosed by a sheet of a relatively heavy expanded sheet metal.

4. The device as defined in claim 1 wherein said pivotal link means includes a pair of front end pivotal links, pivotally connected respectively between front vertical portions of said peripher frames and main length side walls, intermediate the lengths thereof.

5. The device as defined in claim 4 wherein said pivotal link means includes a first pair of rear end pivotal links, pivotally connected respectively between rear vertical portions of said peripheral frame and a rear end of said main length side walls, said front and first rear end pivotal links being of equal lengths and defining a pair of pivotal parallel link connections from each of said abutment members to one of said main length side walls.

6. The device as defined in claim 5 wherein said pivotal link means further includes a second pair of rear end pivotal links, rearwardly of said first rear end links, pivotally connected between respective outer end portions of said first pair of rear end pivotal links and opposed sides of a lock plate including a central aperture sized and positioned to normally provide a free passageway for the hole forming rod assembly.

7. The device as defined in claim 6 including a tool, such as a hole expander, attached to a rear end of a rod segment operably engaged in said pipe installer and extending rearwardly through said aperture, said tool being sized and configurated for non-passage through said aperture whereby actuation of the power operated means in the forward drive mode engages said tool with said lock plate in a manner so as to actuate said pivotal link means to forcably drive said abutment members to said expanded positions.

8. The device as defined in claim 7 wherein said lock means comprises at least one screw shaft having a forward end portion secured relative to a rear end of said main length, and extending rearwardly freely through a hole in said lock plate to a rear end portion, and nut means engaged on said screwthreaded shaft rear end portion for locked engagement against a rear face of said lock plate when said abutment members are in said expanded positions.

9. The device as defined in claim 8 including a pair of said screw shafts and nut means dispesed in a coplanar relation with said rod segment.

* * * * *